Oct. 7, 1952 — R. FORESHAW-SMITH — 2,613,011
CONTAINER FOR CLEANSING LIQUIDS
Filed Sept. 2, 1950

INVENTOR
Rosemary Foreshaw-Smith
BY
Pennie Edmonds Morton and Barrows
ATTORNEYS

Patented Oct. 7, 1952

2,613,011

UNITED STATES PATENT OFFICE 2,613,011

CONTAINER FOR CLEANSING LIQUIDS

Rosemary Foreshaw-Smith, London, England

Application September 2, 1950, Serial No. 183,059
In Great Britain September 2, 1949

2 Claims. (Cl. 220—22)

This invention relates to containers with application pads for complexion milk or skin lotions or cleaning liquids and has for its object to provide an improved construction of container by which the pads are kept saturated with complexion "milk" or skin lotions or with the desired cleansing or cleaning liquid which may be a liquid for removing stains from clothing.

In accordance with the invention the improved container which is suitably in the form of a shallow jar or metal box with a screw-top lid is provided with an internal open-topped casing fitting closely within the side walls of the box and having a perforated removable false bottom affording a space between it and the bottom of the casing for the cleansing or cleaning liquid. This casing is charged with superposed pads of suitable cleaning material disposed on the false bottom. The upper edge of the casing is flanged to fit over the edge of the box and on this upper edge rests a removable protecting lid adapted to be held in place by the screw-top lid of the box. The perforated false bottom which preferably has an upturned rim engaging the side walls of the casing may be supported in the casing by providing a circular rib on the inside of the casing on which the false bottom rests. A central knob on the false bottom will provide for easy removal of the latter from the casing.

Figure 1:
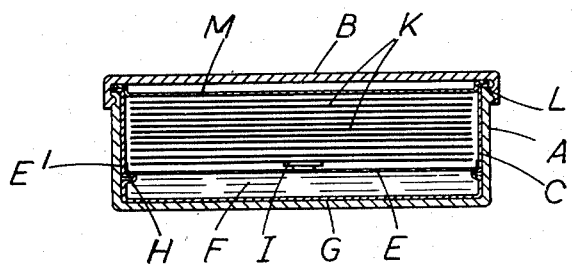
Figure 2:
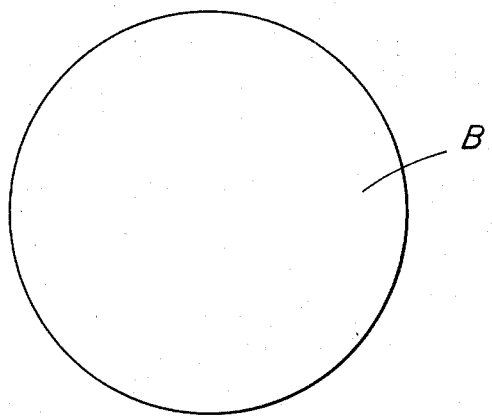
Figure 3:
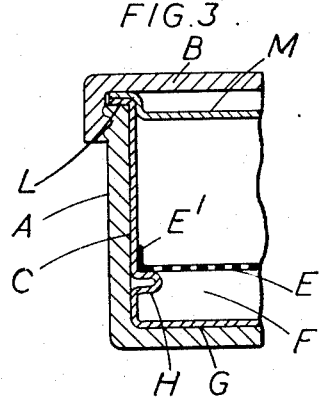

The invention is illustrated in the accompanying drawing in which Fig. 1 shows the improved container in section, Fig. 2 a plan and Fig. 3 a section to enlarged scale showing the container, the casing with the circular rib supporting the perforated false bottom and the false bottom.

As shown the improved container, suitably in the form of a shallow jar or box A with a screw-top lid B, is provided with an internal open-topped casing C fitting closely within the side walls of the box A and having a perforated removable false bottom E affording a space F between it and the bottom of the casing to receive the cleansing or cleaning liquid.

The perforated false bottom E is shown as provided with an upturned rim E′ fitting closely the side wall of the casing and serving to prevent the liquid from seeping up the side walls and is shown as being supported above the bottom G of the casing C by a rib H formed in the casing. A knob I on the false bottom permits its easy removal. K indicates the superposed pads of cleaning material supported on the false bottom E.

The uper side of the casing C is flanged as at L to fit over the upper edge of the box while the removable protecting lid M is also flanged to rest on the flanged edge of the casing. The protecting lid is held in place by the screw-top lid B of the box A.

In use of the device the space F of the casing C is charged with the liquid to be used and the false bottom E placed in position. The pads K are then placed on the false bottom the protecting lid M applied and the lid B of the box A screwed down. By shaking the container the liquid in the casing C is caused to moisten the pads which transmit the liquid to the upper pads by capillary attraction. When it is desired to use one of the pads the screw-top lid B and protecting lid M are removed and the uppermost pad K removed and used.

It will be seen that the invention provides a simple and compact device which can be carried in a bag or pocket which is spill-proof and hygienic and is easily refilled with liquid and pads and avoids the need for carrying bottles, cotton, wool and tissues with their attendant bulk and risk of breakage and spilling.

I claim:

1. A container for complexion milk, skin lotions or cleansing liquids and application pads comprising a shallow box, an open topped casing fitting within the box, seating on the bottom of the box and flanged to rest on the edge of the box, a removable perforated false bottom supported by the casing in spaced relation to the bottom of the casing and providing a support for the pads, a protecting lid supported on the flange of the casing, and a screw top lid on the box serving to hold the protecting lid in position on the casing.

2. A container for complexion milk, skin lotions or cleansing liquids and application pads comprising a shallow box, an open topped casing fitting within said box and flanged to rest on the edge of the box, said casing formed with an annular inwardly projecting rib, a removable perforated false bottom affording a space between it and the bottom of the casing and supported by said rib, said false bottom formed with an upturned rim fitting closely to the wall of the casing, a protecting lid supported on the flange of the casing, and a screw top lid for the box serving to hold the protecting lid in position on the casing.

ROSEMARY FORESHAW-SMITH.

REFERENCES CITED

The following references are of record in the file of this patent:

UNITED STATES PATENTS

| Number | Name | Date |
|---|---|---|
| 344,447 | Johnston | June 29, 1886 |
| 968,752 | Ellis | Aug. 30, 1910 |
| 1,666,105 | Mosler | Apr. 17, 1928 |
| 1,680,150 | Humphrey | Aug. 7, 1928 |
| 2,358,270 | Wild | Sept. 12, 1944 |